United States Patent

Asai et al.

(10) Patent No.: US 8,931,822 B2
(45) Date of Patent: Jan. 13, 2015

(54) VEHICLE SUN VISOR

(71) Applicant: Kyowa Sangyo Co., Ltd., Toyota-shi, Aichi (JP)

(72) Inventors: Takashi Asai, Toyota (JP); Kosuke Yamazaki, Okazaki (JP)

(73) Assignee: Kyowa Sangyo Co., Ltd., Toyota-Shi (JP)

( * ) Notice: Subject to any disclaimer, the term of this patent is extended or adjusted under 35 U.S.C. 154(b) by 0 days.

(21) Appl. No.: 13/903,455

(22) Filed: May 28, 2013

(65) Prior Publication Data

US 2013/0320698 A1    Dec. 5, 2013

(30) Foreign Application Priority Data

May 30, 2012 (JP) .................................. 2012-123480

(51) Int. Cl.
*B60J 3/02*    (2006.01)
(52) U.S. Cl.
CPC .............. *B60J 3/0265* (2013.01); *B60J 3/0239* (2013.01)
USPC ....................... 296/97.1; 296/97.9; 296/97.13
(58) Field of Classification Search
USPC ......... 296/97.1, 97.4, 97.5, 97.8, 97.9, 97.11, 296/97.12, 97.13
See application file for complete search history.

(56) References Cited

U.S. PATENT DOCUMENTS

| | | | |
|---|---|---|---|
| 6,264,264 B1 * | 7/2001 | Kato et al. ................. | 296/97.12 |
| 2005/0225114 A1 * | 10/2005 | Davey et al. ............... | 296/97.11 |
| 2008/0211256 A1 * | 9/2008 | Jones et al. ................ | 296/97.11 |
| 2010/0019527 A1 * | 1/2010 | Asai ............................ | 296/97.1 |
| 2011/0227362 A1 * | 9/2011 | Rockafellow et al. ..... | 296/97.12 |

FOREIGN PATENT DOCUMENTS

| | | |
|---|---|---|
| JP | A-2000-255259 | 9/2000 |
| JP | A-2002-12028 | 1/2002 |
| JP | 2011230560 A | * 11/2011 |

* cited by examiner

*Primary Examiner* — Glenn Dayoan
*Assistant Examiner* — Jason S Daniels
(74) *Attorney, Agent, or Firm* — Oliff PLC (57) ABSTRACT

A vehicle sun visor includes: an urging member that applies turning force toward a storage position to a sun visor body when a turning angle of the sun visor body from the storage position is a predetermined angle or smaller; and a damper that applies braking force when the sun visor body turns. When a turning speed of the sun visor body toward the storage position is a predetermined speed or lower, the damper braking force is smaller than a value obtained by subtracting turning force based on the weight of the sun visor body from the turning force of the urging member, and, when the turning speed exceeds the predetermined speed, the damper braking force is larger than or equal to the value obtained by subtracting the turning force based on the weight of the sun visor body from the turning force of the urging member.

8 Claims, 11 Drawing Sheets

VEHICLE SUN VISOR

INCORPORATION BY REFERENCE

The disclosure of Japanese Patent Application No. 2012-123480 filed on May 30, 2012 including the specification, drawings and abstract is incorporated herein by reference in its entirety.

BACKGROUND OF THE INVENTION

1. Field of the Invention

The invention relates to a vehicle sun visor that is configured to be turnable between a storage position at which a sun visor body is oriented along a ceiling surface of a vehicle cabin and a use position at which the sun visor body is able to block light.

2. Description of Related Art

Figure 15:
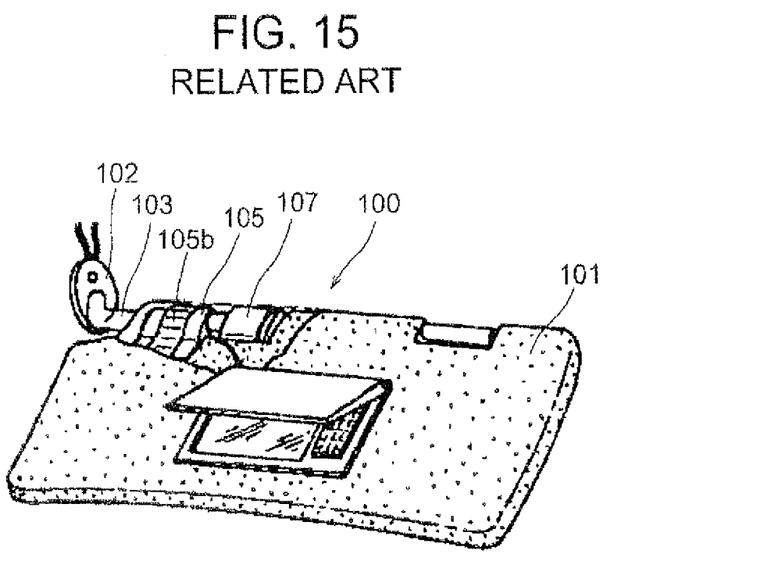
FIG. 15 is a partially cut-out perspective view that shows a vehicle sun visor according to the related art.
Figure 16:
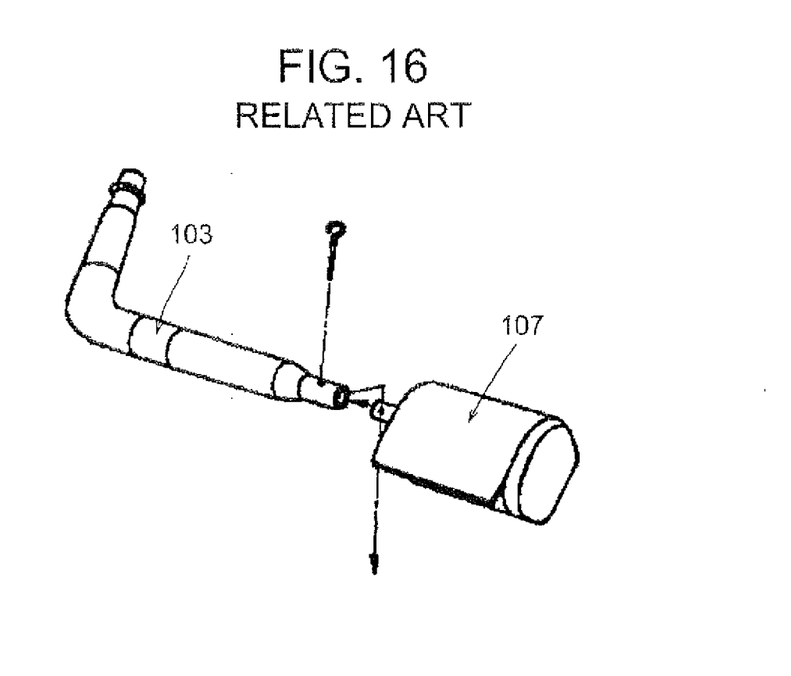
FIG. 16 is a perspective view that shows a coupling structure between a support shaft and a damper in the vehicle sun visor according to the related art.

A related vehicle sun visor is described in Japanese Patent Application Publication No 2002-012028 (JP 2002-012028 A). As shown in FIG. 15, the vehicle sun visor 100 includes a sun visor body 101 and a support shaft 103 connected to a ceiling surface of a vehicle cabin by a bracket 102. Then, the sun visor body 101 is configured to be turnable around the axis of the support shaft 103 between a storage position at which the sun visor body 101 is oriented along the ceiling surface of the vehicle cabin and a use position at which the sun visor body 101 is able to block light. A bearing portion 105 for the support shaft 103 is provided inside the sun visor body 101, and a leaf spring 105b that radially sandwiches the support shaft 103 is set at the bearing portion 105. The leaf spring 105b is configured to be able to hold the sun visor body 101 at the shading position and, when the sun visor body 101 is returned to near the storage position, to apply turning force toward the storage position. Therefore, when the sun visor body 101 is located near the storage position, the sun visor body 101 is returned to the storage position by the spring force of the leaf spring 105b and is held at the storage position. As shown in FIG. 16, a damper 107 is provided inside the sun visor body 101, and the distal end of the support shaft 103 is coupled to the damper 107. The damper 107 applies braking force to a turn of the sun visor body 101 with respect to the support shaft 103, and functions to suppress turning speed with the spring force of the leaf spring 105b at the time when the sun visor body 101 turns toward the storage position. Thus, it is possible to suppress unpleasant sound due to a bump against the ceiling surface at the time when the sun visor body 101 is stored.

However, the braking force of the damper 107 in the vehicle sun visor 100 is set to a value such that the turning speed is suppressed by the spring force of the leaf spring 105b at the time when the sun visor body 101 turns toward the storage position. That is, the braking force of the damper 107 is set so as to be smaller than the spring force of the leaf spring 105b. Therefore, for example, when an occupant applies large operating force to the sun visor body 101 toward the storage position, the sun visor body 101 bumps against the ceiling surface at the storage position to generate unpleasant sound even when the braking force of the damper 107 works.

SUMMARY OF THE INVENTION

The invention is able to reduce unpleasant sound at the time of storing a sun visor body by causing the sun visor body not to bump against a ceiling surface even when large operating force is applied to the sun visor body toward a storage position.

An aspect of the invention provides a vehicle sun visor including a sun visor body and a support shaft mounted on a ceiling surface of a vehicle cabin and configured to support the sun visor body at a turning center position of the sun visor body such that the sun visor body is turnable between a storage position at which the sun visor body is oriented along the ceiling surface of the vehicle cabin and a use position at which the sun visor body is able to block light. The vehicle sun visor includes an urging member configured to, when a turning angle of the sun visor body from the storage position is smaller than or equal to a predetermined angle, apply turning force toward the storage position to the sun visor body and a damper configured to apply braking force at the time when the sun visor body turns. When a turning speed of the sun visor body toward the storage position is lower than or equal to a predetermined speed, the braking force of the damper is smaller than a value obtained by subtracting turning force based on the weight of the sun visor body from the turning force of the urging member, and, when the turning speed toward the storage position exceeds the predetermined speed, the braking force of the damper is larger than or equal to the value obtained by subtracting the turning force based on the weight of the sun visor body from the turning force of the urging member.

According to the above aspect, when the sun visor body is returned to near the storage position and the turning angle of the sun visor body from the storage position is smaller than or equal to the predetermined angle, the sun visor body is returned to the storage position by the turning force of the urging member, and is held at the storage position. At this time, when the turning speed of the sun visor body is lower than or equal to the predetermined speed, the braking force of the damper is smaller than the value obtained by subtracting the turning force based on the weight of the sun visor body from the turning force of the urging member. Therefore, a turn of the sun visor body toward the storage position is not stopped by the damper, and the sun visor body gently turns and bumps against the ceiling surface. Thus, it is possible to reduce unpleasant sound caused by storing the sun visor body. In addition, for example, when an occupant turns the sun visor body toward the storage position with strong operating force and the turning speed of the sun visor body exceeds the predetermined speed, the braking force of the damper becomes larger than or equal to the value obtained by subtracting the turning force based on the weight of the sun visor body from the turning force of the urging member. Therefore, a turn of the sun visor body toward the storage position is stopped by the damper, and it is possible to reduce unpleasant sound due to a bump of the sun visor body against the ceiling surface.

In the above aspect, the braking force of the damper may be set so as to be larger when the sun visor body is turned toward the storage position than when the sun visor body is turned toward the use position. Therefore, the braking force of the damper does not interfere at the time when the sun visor body is turned toward the use position. In addition, in the above aspect, when the turning speed of the sun visor body toward the storage position exceeds the predetermined speed, that is, 3 rpm to 10 rpm, the braking force of the damper may be larger than or equal to the value obtained by subtracting the turning force based on the weight of the sun visor body from the turning force of the urging member. In addition, in the above aspect, the urging member may be a leaf spring.

According to the above aspect, even when large operating force is applied to the sun visor body toward the storage position, the sun visor body does not bump against the ceiling surface, so it is possible to reduce unpleasant sound at the time of storing the sun visor body.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a vehicle sun visor according to an embodiment of the invention will be described with reference to FIG. 1 to FIG. 14. Here, the front, rear, right, left, upper and lower in the drawings respectively correspond to the front, rear, right, left, upper and lower of a vehicle to which the vehicle sun visor is mounted.

Figure 1:
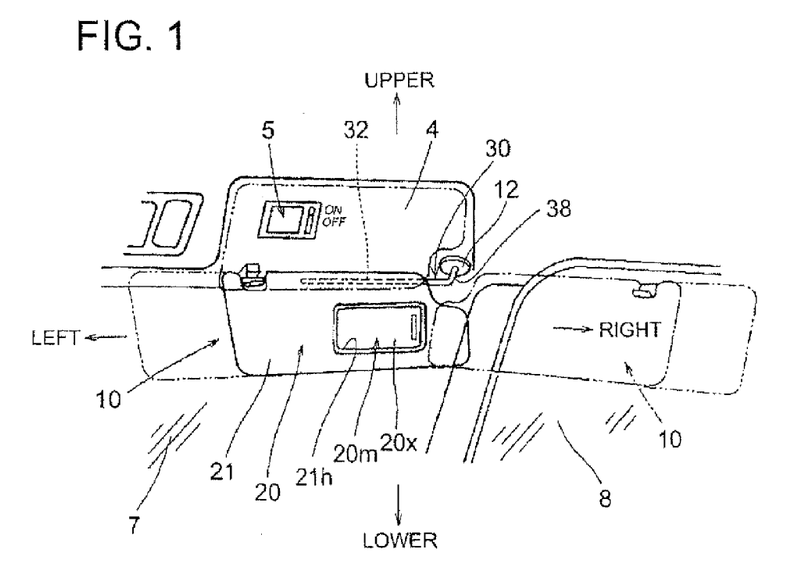
FIG. 1 is a schematic perspective view that shows a cabin of a passenger automobile that includes a vehicle sun visor according to a first embodiment of the invention.
Figure 2:
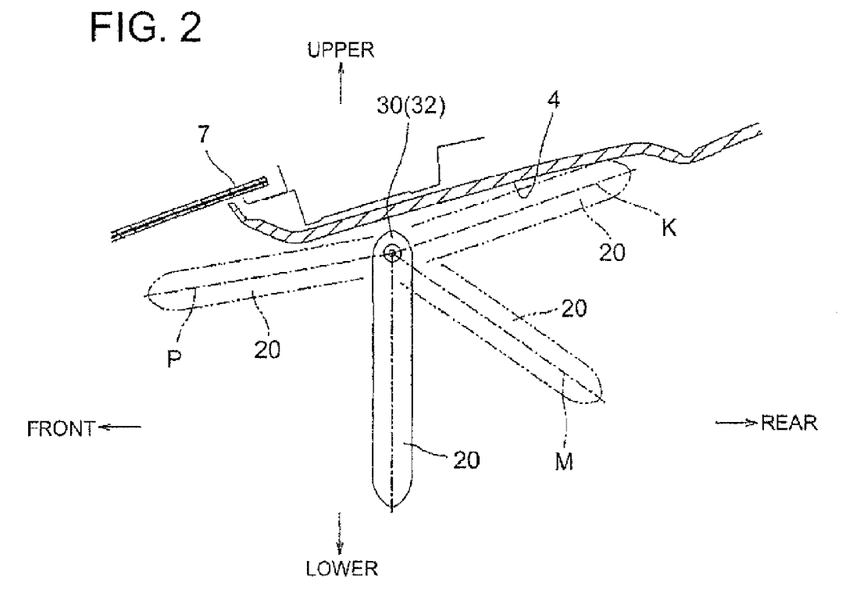
FIG. 2 is a side view that shows a turning range of a sun visor body of the vehicle sun visor.

As shown in FIG. 1, the vehicle sun visor 10 (hereinafter, referred to as sun visor 10) includes a substantially rectangular sun visor body 20 and a support shaft 30 The sun visor body 20 blocks sunlight that enters a vehicle cabin. The support shaft 30 is mounted on a ceiling surface 4 of the vehicle cabin by a bracket 12. The support shaft 30 is formed of a linear lateral shaft 32 and a longitudinal shaft 38 provided at the proximal end portion side of the lateral shaft 32. The longitudinal shaft 38 is coupled to the bracket 12 so as to be rotatable around its axis. The lateral shaft 32 of the support shaft 30 is inserted in the top side location (see FIG. 1) of the sun visor body 20 in a state where the lateral shaft 32 is relatively rotatable with respect to the sun visor body 20 along the top side. Thus, as shown in FIG. 2, the sun visor body 20 is turnable about the axis of the support shaft 30 (lateral shaft 32) between a storage position K at which the sun visor body 20 is oriented along the ceiling surface 4 of the vehicle cabin and a use limit position P at which the sun visor body 20 is oriented along a windshield 7 of the vehicle cabin. Here, the sun visor body 20 receives turning force toward the storage position K between the storage position K and an urging start position M (see FIG. 2) as will be described later. Between the urging start position M and the use limit position P, the sun visor body 20 receives holding force so as to be held at a turning stop position and not to be turned by turning force under its own weight. Then, in a state where the sun visor body 20 is placed between the urging start position M and the use limit position P, the sun visor body 20 is able to block sunlight, and this position is the use position of the sun visor body 20. That is, a region between the storage position K and the urging start position M is termed storage position-side turning region, and a region between the urging start position M and the use limit position P is termed holding region. Furthermore, by rotating the longitudinal shaft 38 of the support shaft 30 in the counterclockwise direction around its axis with respect to the bracket 12, it is possible to move the sun visor body 20 to a position of a window 8 of a door as indicated by the alternate long and two short dashes line in FIG. 1. As shown in FIG. 1, a room lamp 5 is provided at the storage position of the sun visor body 20 on the ceiling surface 4 of the vehicle cabin. The room lamp 5 is able to light up in synchronization with, for example, turning motion of the sun visor body 20.

Figure 3:
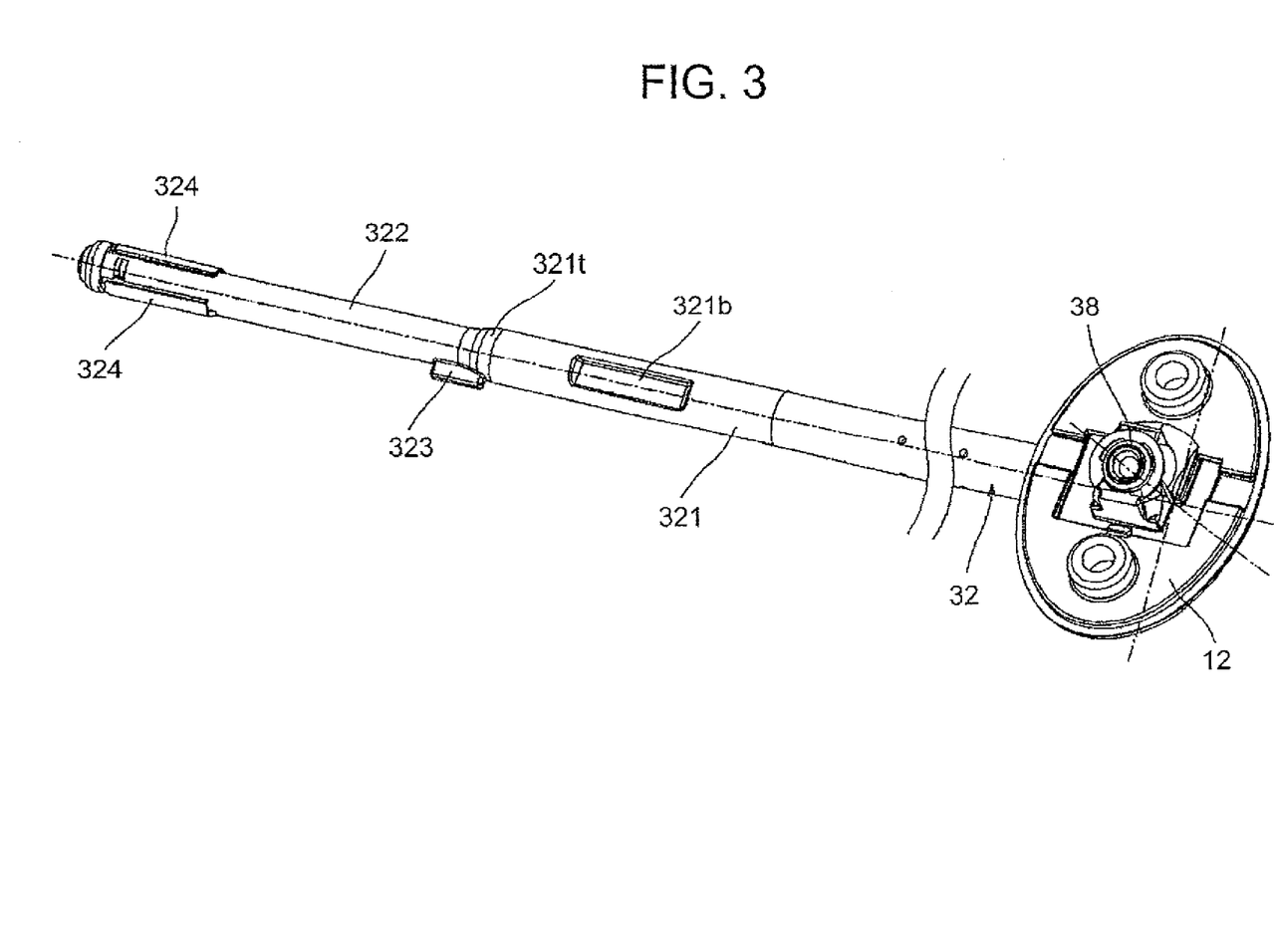
FIG. 3 is a perspective view that shows a support shaft and bracket of the vehicle sun visor.

The support shaft 30 is formed of a cylindrical shaft member, and electric wires that are connected to an electrical circuit of the room lamp 5 are inserted through the inside of the support shaft 30. As shown in FIG. 3, the lateral shaft 32 of the support shaft 30 is formed of a proximal end portion-side large-diameter portion 321 having a large diameter and a distal end-side small-diameter portion 322 having a diameter smaller than that of the large-diameter portion 321. A tapered portion 321t that gradually changes in diameter is provided between the large-diameter portion 321 and small-diameter portion 322 of the lateral shaft 32. In addition, a detent 323 is provided from the tapered portion 321 t to the proximal end portion of the small-diameter portion 322. The detent 323 is a protrusion that protrudes radially outward. The distal end portion, that is, the location close to the tapered portion 321*t*, of the large-diameter portion 321 of the lateral shaft 32 is a portion that is inserted through a bearing portion 25 (described later) of the sun visor body 20, and a portion of the outer periphery of this portion in the circumferential direction is cut into a flat shape, and a leaf spring contact flat face 321*b* is formed. In addition, an electrode portion 324 (described later) is provided at the distal end portion of the small-diameter portion 322 of the lateral shaft 32. The electrode portion 324 operates as the sun visor body 20 turns from the storage position K to the use position with respect to the support shaft 30 (lateral shaft 32).

Figure 4A:
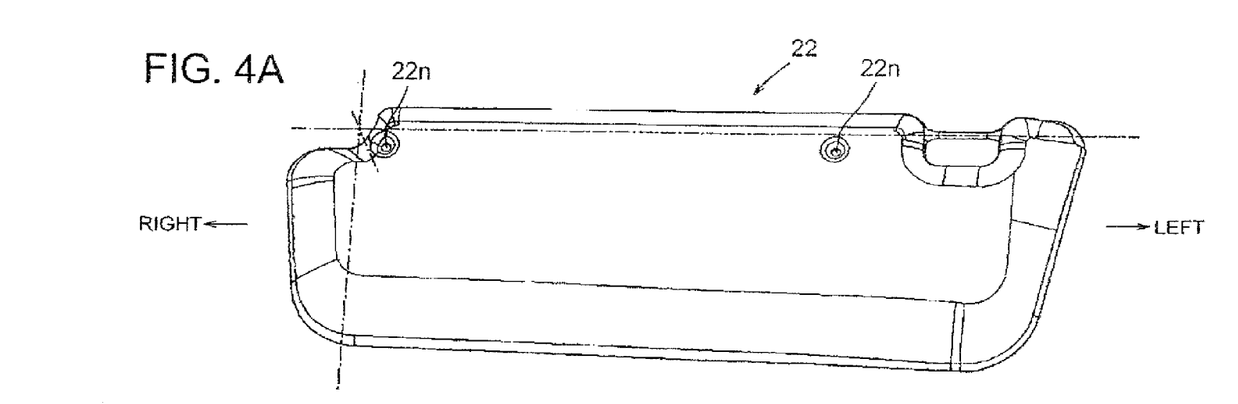
FIG. 4A is a perspective view of a back-side shell member that constitutes the sun visor body of the vehicle sun visor when viewed from a back side.
Figure 4B:
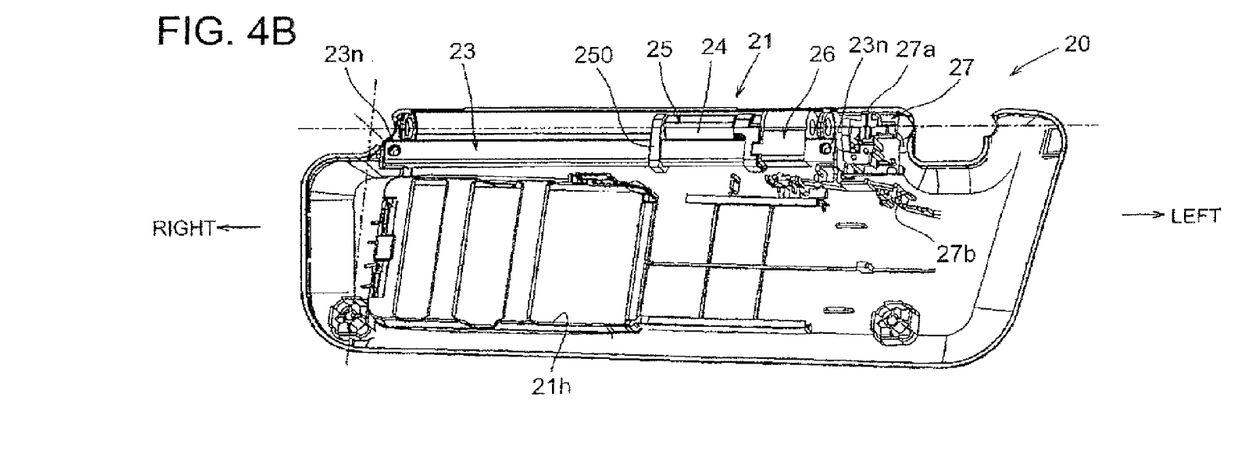
FIG. 4B is a perspective view of a front-side shell member that constitutes the sun visor body of the vehicle sun visor when viewed from the back side.

As shown in FIG. 4A and FIG. 4B, the sun visor body 20 is formed into a hollow shape by mating a shell-shaped front-side shell member 21 and a shell-shaped back-side shell member 22 with each other. The front-side shell member 21 and the back-side shell member 22 are, for example, molded by injecting resin into a molding die, Here, the front side of the sun visor body 20 means a face on a side facing an occupant when the sun visor body 20 is placed at the use position at which the sun visor body 20 is able to block light. FIG. 4B shows the back side of the front-side shell member 21 for the sake of easy view of the inside of the front-side shell member 21. As shown in FIG. 1, a rectangular recess 21*h* is formed on the right location with respect to the center on the surface of the front-side shell member 21 of the sun visor body 20, and a rectangular mirror unit 20*m* is fitted into the rectangular recess 21*h*. In addition, as shown in FIG. 4B, a slide rail 23, the bearing portion 25, a damper 26 and a switch 27 are provided at a location corresponding to the top, side of the sun visor body 20 inside the front-side shell member 21 of the sun visor body 20.

Figure 5:
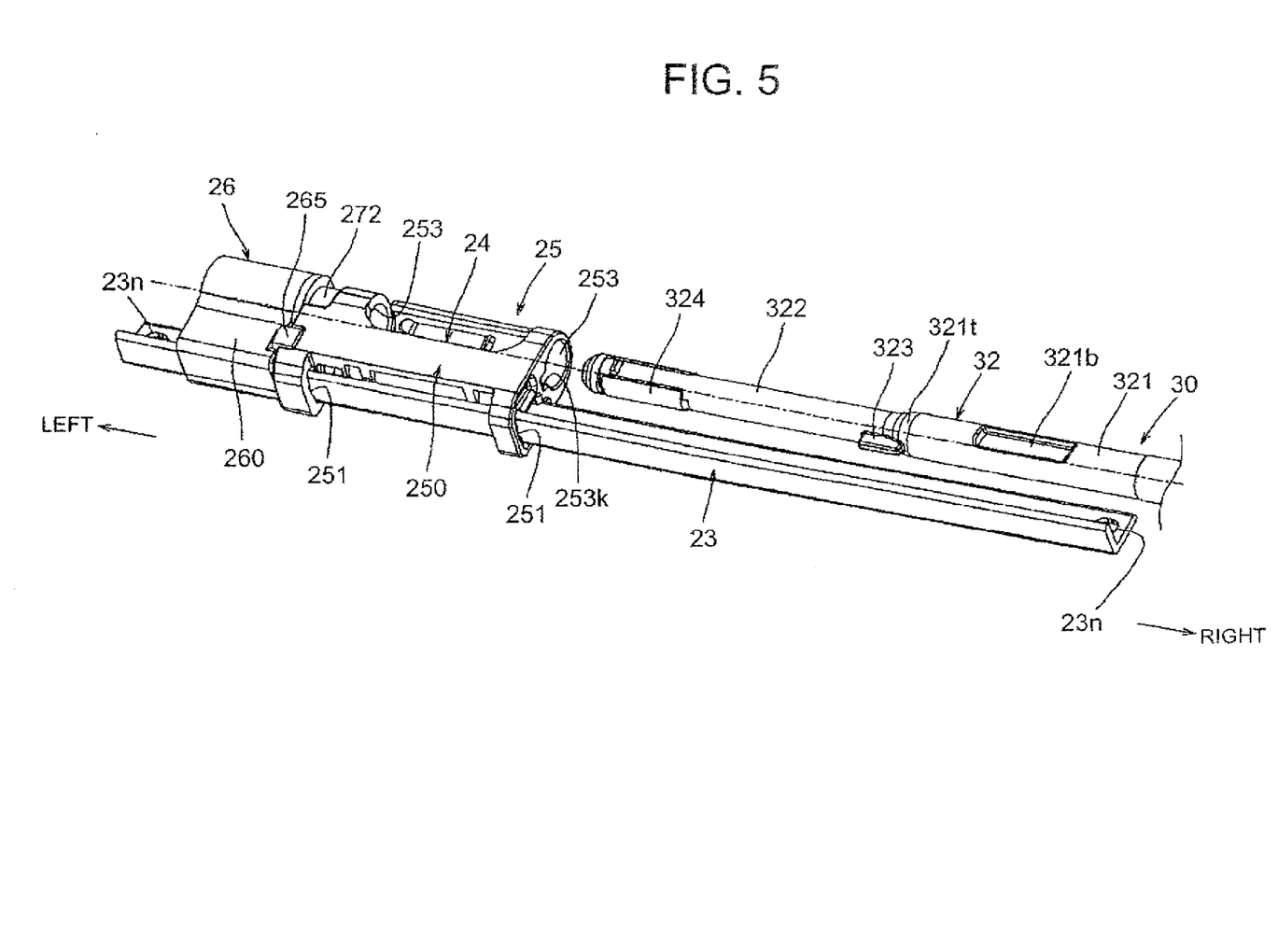
FIG. 5 is a perspective view of a damper, a bearing portion and a slide rail incorporated in the sun visor body and part of the support shaft when viewed from the front side of the sun visor body.
Figure 6:
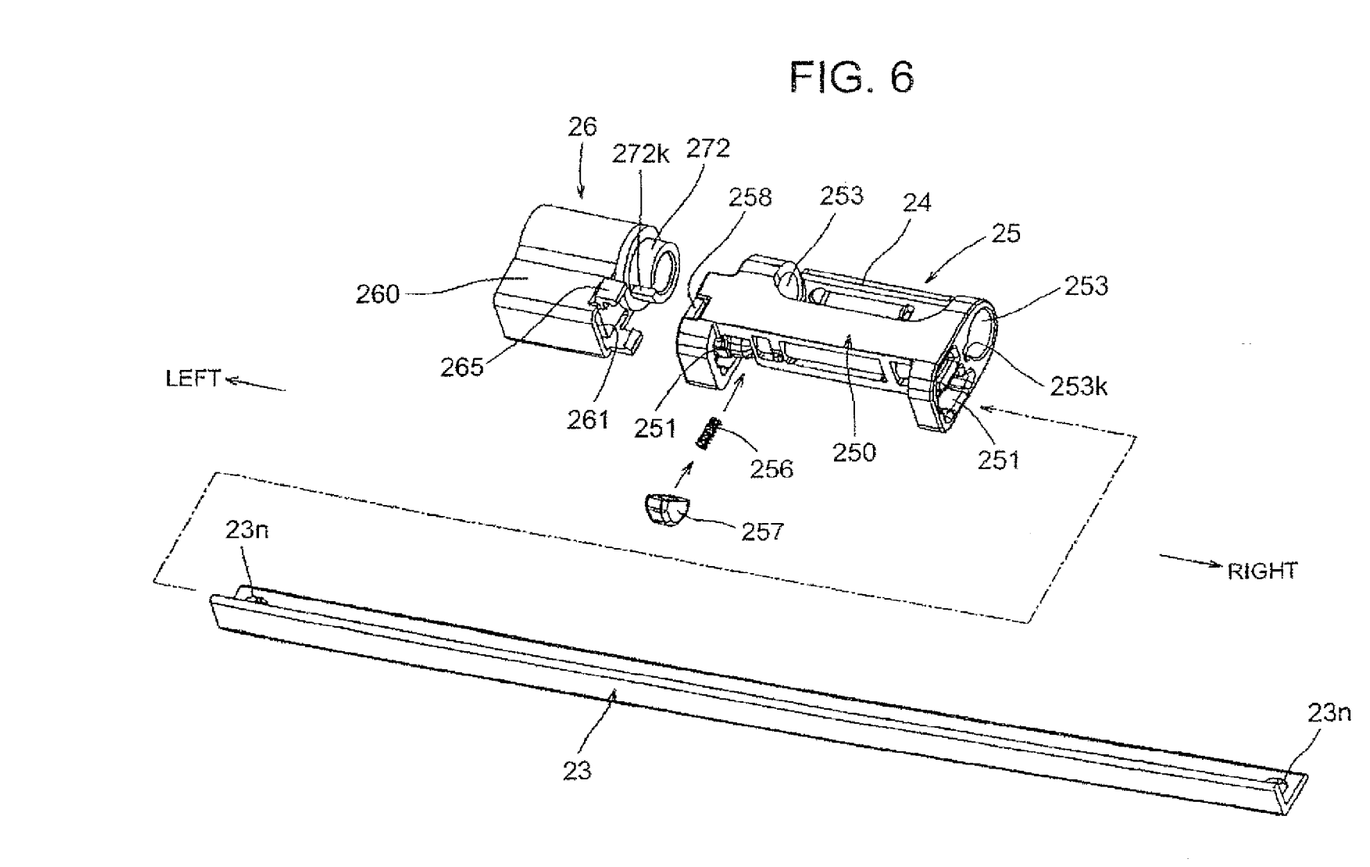
FIG. 6 is an exploded perspective view of the damper, the bearing portion and the slide rail that are incorporated in the sun visor body.

As shown in FIG. 4A to FIG. 6, the slide rail 23 is a linear rail having an L shape in cross section. The slide rail 23 is mounted along the top side of the sun visor body 20, and is configured to be able to couple the bearing portion 25 and the damper 26 to the sun visor body 20. That is, as shown in FIG. 5, FIG. 6, and the like, a case 250 of the bearing portion 25 has an L-shaped through-hole 251 having a substantially L shape in cross section, a rotor case 260 of the damper 26 has an L-shaped through-hole 261 having a substantially L shape in cross section, and the slide rail 23 is inserted through those L-shaped through-holes 251, 261. Therefore, the bearing portion 25 and the damper 26 are movable along the slide rail 23, and are held relatively non-rotatable around the axis of the slide rail 23. Through-holes 23*n* are respectively formed at both end locations of the slide rail 23. In addition, internal threaded holes (not shown) are respectively formed at both right and left sides of the location corresponding to the top side of the sun visor body 20 inside the front-side shell member 21, and, as shown in FIG. 4B, the through-holes 23*n* of the slide rail 23 are respectively aligned with the internal threaded holes. Furthermore, through-holes 22*n* are respectively formed in the back-side shell member 22 at locations corresponding to the internal threaded holes (not shown) of the front-side shell member 21 (see FIG. 4A). Therefore, it is possible to screw the slide rail 23 and the back-side shell member 22 to the front-side shell member 21 together. The switch 27 is fixed to the inside of the front-side shell member 21 at the left side (right side on the sheet of FIG. 4B) of the slide rail 23. The switch 27 includes an electrode receiving portion 27*a* and a switch body portion 27*b*. The electrode portion 324 at the distal end of the support shaft 30 is inserted in the electrode receiving portion 27*a*. When a lid 20*x* (see FIG. 1) of the mirror unit 20*m* is opened, the switch body portion 27*b* is pressed by the lid 20*x* and, as a result, the switch body portion 27*b* operates.

Figure 7:
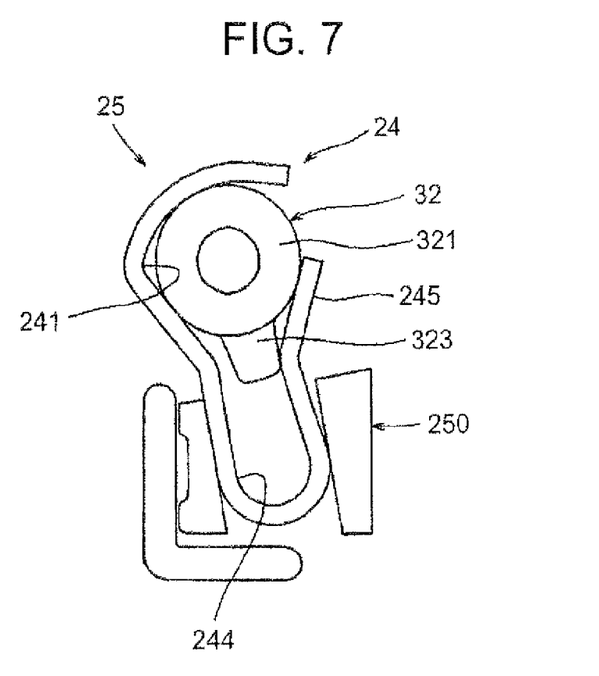
FIG. 7 is a schematic cross-sectional view perpendicular to an axis of a leaf spring portion of the bearing portion.

The bearing portion 25 supports the large-diameter portion 321 of the lateral shaft 32 of the support shaft 30, and is configured to be able to apply turning force toward the storage position K to the sun visor body 20 between the storage position K and the urging start position M and to apply holding force to the sun visor body 20 between the urging start position M and the use limit position P. With the holding force, it is possible to hold the sun visor body 20 at a current position. As shown in FIG. 5 to FIG. 7, the bearing portion 25 is formed of the case 250 and a leaf spring 24. The slide rail 23 is inserted through the case 250. The leaf spring 24 is accommodated in the case 250. The case 250 is formed in a substantially H shape in side view, and has the L-shaped through-holes 251 at both right and left ends at its lower portion. The slide rail 23 is inserted through the L-shaped through-holes 251. In addition, bearing bodies 253 are respective formed at both right and left ends of the upper portion of the case 250. The large-diameter portion 321 of the lateral shaft 32 of the support shaft 30 is inserted through the bearing bodies 253. Then, a rectangular cutout portion 253*k* is formed at the lower end location of each bearing body 253. Thus, at the time when the lateral shaft 32 of the support shaft 30 is inserted through the bearing bodies 253, the detent 323 of the lateral shaft 32 is allowed to pass through portions corresponding to the rectangular cutout portions 253*k*. In addition, as shown in FIG. 6, the case 250 has a slider 257 that is pressed against the upper face of the slide rail 23 by the spring force of a spring 256. Thus, it is possible to reduce rattling at the time when the case 250 of the bearing portion 25 slides on the slide rail 23. Furthermore, a pawl receiving portion 258 is provided at the left end location of the case 250. A coupling pawl 265 provided at the rotor case 260 of the damper 26 is hooked to the pawl receiving portion 258.

Figures 8A, 8B:
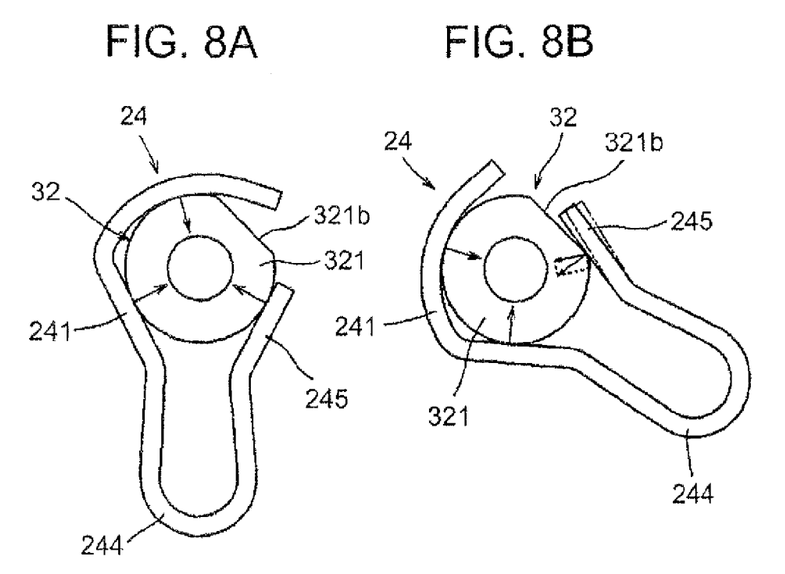
FIG. 8A is a schematic cross-sectional view that shows the function of the leaf spring.
FIG. 8B is a schematic cross-sectional view that shows the function of the leaf spring.

The leaf spring 24 of the bearing portion 25 is fitted between the right and left bearing bodies 253 of the case 250. As shown in FIG. 7, FIG. 8A and FIG. 8B, the leaf spring 24 is formed of a substantially trapezoidal surrounding portion 241, a U-shaped spring portion 244 and a flat sheet portion 245. The surrounding portion 241 presses the outer periphery of the large-diameter portion 321 of the lateral shaft 32 at two portions spaced at an interval of about 120° in the circumferential direction. The U-shaped spring portion 244 is bent in a hairpin shape continuously with the surrounding portion 241. The flat sheet portion 245 is provided at the other end side of the U-shaped spring portion 244, and presses the outer periphery of the large-diameter portion 321 of the lateral shaft 32 from a location spaced at an interval of about 120° in the circumferential direction from the surrounding portion 241. The width (width in the direction along the axis of the lateral shaft 32) of the flat sheet portion 245 of the leaf spring 24 is set so as to be equal to the axial length of the leaf spring contact flat face 321*b* formed at the large-diameter portion 321 of the lateral shaft 32. In addition, the width of each of the surrounding portion 241 and U-shaped spring portion 244 of the leaf spring 24 is set to a value sufficiently larger than the width of the flat sheet portion 245.

When the sun visor body 20 is located in the use position (between the urging start position M and the use limit position P), the surrounding portion 241 and flat sheet portion 245 of the leaf spring 24 both press the outer periphery of the large-diameter portion 321 of the lateral shaft 32 as shown in FIG. 8A, and spring force that acts toward the center of the large-diameter portion 321 of the lateral shaft 32 keeps balance in the circumferential direction. Therefore, the large-diameter portion 321 of the lateral shaft 32 is fastened from the surroundings by the spring force of the leaf spring 24, and a turn under its own weight of the sun visor body 20 with respect to the lateral shaft 32 of the support shaft 30 is prohibited. That is, the sun visor body 20 is held at the use position. In addition, when the sun visor body 20 is located between the storage position K and the urging start position M, the surrounding portion 241 of the leaf spring 24 presses the outer periphery of the large-diameter portion 321 of the lateral shaft 32, and the flat sheet portion 245 presses part of the leaf spring contact flat face 321b of the large-diameter portion 321 as shown in FIG. 8B. Thus, spring force that acts on the large-diameter portion 321 of the lateral shaft 32 loses balance in the circumferential direction, and turning force toward the storage position K acts on the sun visor body 20. That is the leaf spring 24 of the bearing portion 25 corresponds to an urging member of the invention.

Figure 9A:
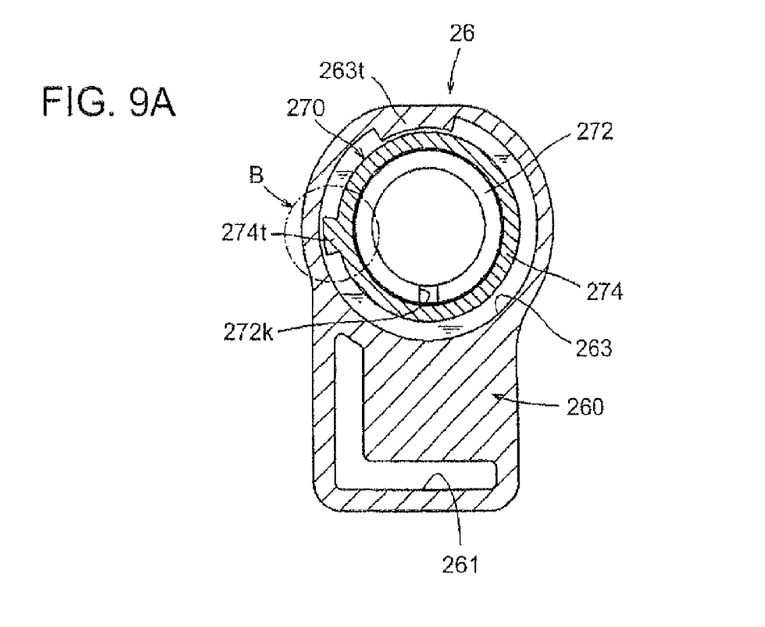
FIG. 9A is a schematic view that shows the structure of the damper.

The damper 26 is used to apply braking force to a turn of the sun visor body 20 toward the storage position K and not to generate unpleasant sound at the time when the sun visor body 20 contacts the ceiling surface 4 of the vehicle cabin at the storage position K. As shown in FIG. 9A, the damper 26 includes a cylindrical rotor 270 and the rotor case 260. The rotor case 260 supports the rotor 270 such that the rotor 270 is rotatable around its axis. The rotor case 260 of the damper 26 has the L-shaped through-hole 261 at its lower-side location. The slide rail 23 of the sun visor body 20 is inserted through the L-shaped through-hole 261. As shown in FIG. 6, the rotor case 260 has the coupling pawl 265 at its side face of the lower location. The coupling pawl 265 couples the rotor case 260 to the case 250 of the bearing portion 25. In addition, at the upper location of the rotor case 260 of the damper 26, a bearing portion (not shown) that supports the rotor 270 such that the rotor 270 is rotatable around the axis is provided, and as shown in FIG. 9A, a ring-shaped hydraulic pressure chamber 263 is provided around the bearing portion. A stepped partition wall 263t is provided on the inner periphery of the hydraulic pressure chamber at a portion in the circumferential direction. The partition wall 263t protrudes radially inward.

Figure 9B:
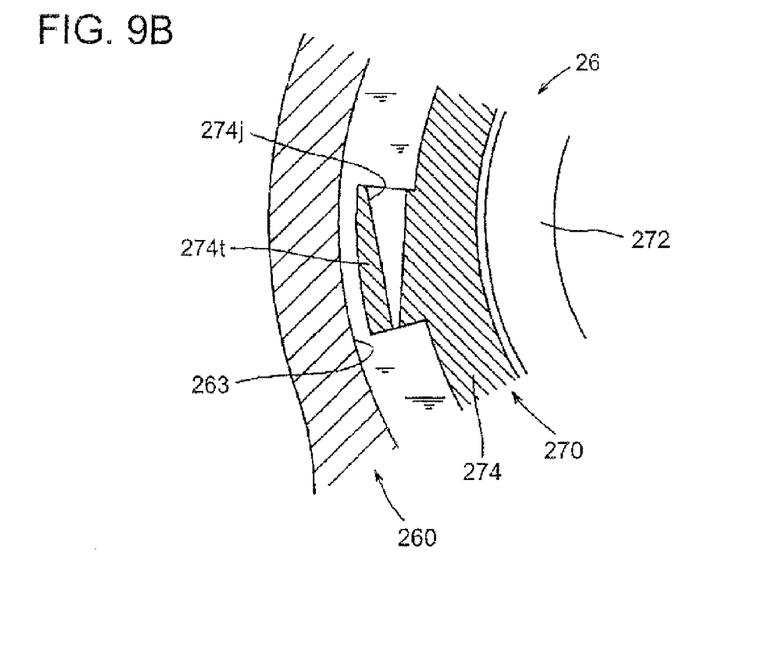
FIG. 9B is an enlarged view of portion B in FIG. 9A.

As shown in FIG. 9A, the rotor 270 includes a cylindrical rotor body 272 through which the small-diameter portion 322 of the lateral shaft 32 of the support shaft 30 is inserted. As shown in FIG. 6, the right end portion of the rotor body 272 protrudes in the axial direction from the rotor case 260, and a detent cutout 272k to which the detent 323 formed at the lateral shaft 32 of the support shaft 30 is formed at the protruded end portion. That is, the small-diameter portion 322 of the lateral shaft 32 of the support shaft 30 is inserted in the rotor body 272 and the detent 323 of the lateral shaft 32 is fitted to the detent cutout 272k of the rotor body 272. Thus, the rotor 270 is held so as to be relatively non-rotatable with respect to the lateral shaft 32 of the support shaft 30. As shown in FIG. 9A, a hydraulic pressure receiving portion 274 molded in a flange shape is coaxially provided on the outer periphery of the rotor body 272 of the rotor 270. In a state where the rotor body 272 of the rotor 270 is accommodated in the bearing portion of the rotor case 260, the hydraulic pressure receiving portion 274 of the rotor 270 is accommodated in the hydraulic pressure chamber 263 of the rotor case 260. The partition wall 274t is formed in the hydraulic pressure receiving portion 274 of the rotor 270 such that a portion in the circumferential direction protrudes radially outward. In addition, as shown in FIG. 9B, the partition wall of the hydraulic pressure receiving portion 274 has a tapered fluid passage 274j that effectively allows fluid to pass therethrough at the time when the rotor 270 rotates in the forward direction (the sun visor body 20 turns toward the use position) and that makes it hard to pass fluid at the time when the rotor 270 rotates in the reverse direction.

With the above configuration, when the rotor 270 rotates in the forward direction with respect to the rotor case 260, fluid pressed by the partition wall 274t of the hydraulic pressure receiving portion 274 of the rotor 270 passes through between the partition wall 274t and the inner periphery of the hydraulic pressure chamber 263 of the rotor case 260, and further passes through the fluid passage 274j of the partition wall 274t. In addition, the fluid passes through between the partition wall 263t of the hydraulic pressure chamber 263 of the rotor case 260 and the outer periphery of the hydraulic pressure receiving portion 274 of the rotor 270. Thus, the braking force of the damper 26 becomes a relatively small value. On the other hand, when the rotor 270 rotates in the reverse direction with respect to the rotor case 260, fluid pressed by the partition wall 274t of the hydraulic pressure receiving portion 274 of the rotor 270 almost cannot pass through the fluid passage 274j of the partition wall 274t. Therefore, as compared to the forward rotation, the braking force of the damper 26 increases.

Figure 10:
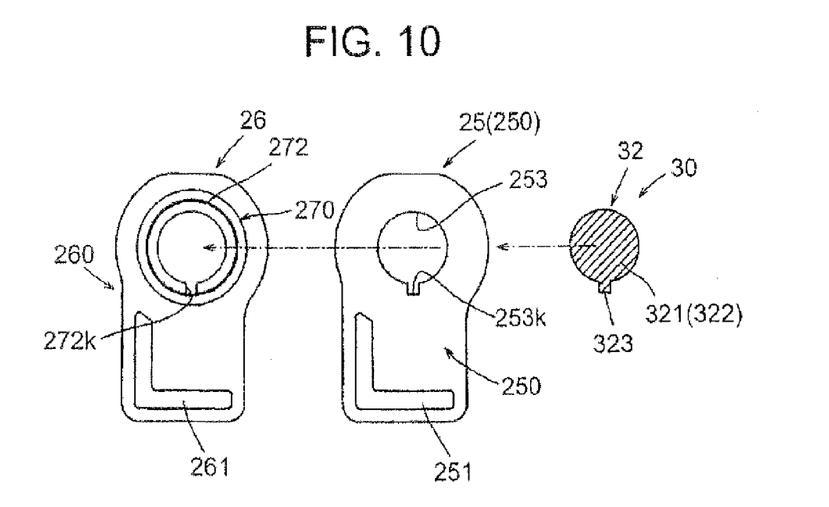
FIG. 10 is a schematic view that shows a detent structure for the support shaft with respect to the damper and a retaining structure for the support shaft with respect to the bearing portion.

Next, assembling of the sun visor body 20 and the support shaft 30 will be described. First, as shown in FIG. 4B, the switch 27 is mounted at a predetermined location of the front-side shell member 21 of the sun visor body 20. Subsequently, as shown in FIG. 10, the phase of the detent cutout 272k of the rotor 270 of the damper 26 is adjusted to the phase of the cutout portions 253k provided at the bearing bodies 253 of the case 250 of the bearing portion 25. That is, the detent cutout 272k is held downward by rotating the rotor 270 of the damper 26. In this state, the slide rail 23 is passed through the L-shaped through-hole 261 of the rotor case 260 of the damper 26 and the L-shaped through-hole 251 of the case 250 of the bearing portion 25. Then, the coupling pawl 265 formed at the rotor case 260 of the damper 26 is engaged with the pawl receiving portion 258 of the case 250 of the bearing portion 25, thus coupling the damper 26 to the bearing portion 25 (see FIG. 5). Subsequently, the through-holes 23n at both ends of the slide rail 23 are aligned with the internal threaded holes (not shown) of the front-side shell member 21, the through-holes 22n of the back-side shell member 22 are further aligned with the internal threaded holes (not shown) of the front-side shell member 21, and the slide rail 23 and the back-side shell member 22 are screwed together to the front-side shell member 21. In this state, mounting of the damper 26 and the bearing portion 25 on the sun visor body 20 is completed.

After that, the detent 323 of the lateral shaft 32 of the support shaft 30 is oriented downward as shown in FIG. 10, the lateral shaft 32 is inserted from the right side of the sun visor body 20 to the top side location of the sun visor body 20. At this time, the distal end side of the lateral shaft 32 of the support shaft 30 is the small-diameter portion 322, so the small-diameter portion 322 is smoothly inserted through the bearing body 253 of the bearing portion 25 and the leaf spring 24, and is able to guide the large-diameter portion 321 to the location of the bearing body 253 and leaf spring 24. Here, the detent 323 formed between the small-diameter portion 322 and large-diameter portion 321 of the lateral shaft 32 is held downward, and is aligned with the phase of the cutout portions 253k respectively formed at the bearing bodies 253 of the bearing portion 25. Therefore, the detent 323 of the lateral shaft 32 is allowed to pass through the cutout portion 253k of the right-side bearing body 253, and the large-diameter portion 321 of the lateral shaft 32 is allowed to be inserted through the bearing portion 25. That is, the large-diameter portion 321 of the lateral shaft 32 that has passed through the right-side bearing body 253 is inserted through the leaf spring 24 in process of being pressed leftward, and further inserted through the left-side (damper 26-side) bearing body 253. The detent 323 of the lateral shaft 32 has passed through the cutout portion 253k of the left-side bearing body 253, and is then fitted to the detent cutout 272k of the damper 26 (rotor body 272) having the same phase as that of the cutout portions 253k. This position is an insertion limit position of the lateral shaft 32, and the axial location of the leaf spring contact flat face 321b formed at the large-diameter portion 321 of the lateral shaft 32 coincides with the axial location of the flat sheet portion 245 provided at the leaf spring 24 of the bearing portion 25.

The small-diameter portion 322 at the distal end side of the lateral shaft 32, which has passed through the bearing portion 25, is inserted through the rotor body 272 of the rotor 270 of the damper 26, and then the distal end portion of the small-diameter portion 322, that is, the electrode portion 324, is inserted into the electrode receiving portion 27a of the switch 27. In this way, in a state where the lateral shaft 32 of the support shaft 30 is inserted in the sun visor body 20 to the insertion limit position, the sun visor body 20 is turned around its axis with respect to the lateral shaft 32. Thus, the rotor case 260 of the damper 26 mounted on the sun visor body 20 rotates with respect to the rotor 270 of the damper 26 engaged with the lateral shaft 32 of the support shaft 30. In addition, similarly, the bearing portion 25 and the switch 27 that are mounted on the sun visor body 20 rotate with respect to the lateral shaft 32 of the support shaft 30. As a result, the detent 323 of the lateral shaft 32 that has passed through the cutout portion 253k of the left-side (damper 26-side) bearing body 253 of the bearing portion 25 rotates with respect to the cutout portion 253k of the bearing body 253, and is hooked on the outside of the bearing body 253. Thus, the lateral shaft 32 of the support shaft 30 is retained with respect to the sun visor body 20. Therefore, the damper 26 and bearing portion 25 of the sun visor body 20 are held so as to be relatively non-movable in the axial direction with respect to the lateral shaft 32 of the support shaft 30. Here, the damper 26 and the bearing portion 25 are configured to be movable along the slide rail 23 fixed to the sun visor body 20. Therefore, it is possible to slide the sun visor body 20 by the length of the slide rail 23 with respect to the lateral shaft 32 of the support shaft 30, the damper 26 and the bearing portion 25.

Figure 11:
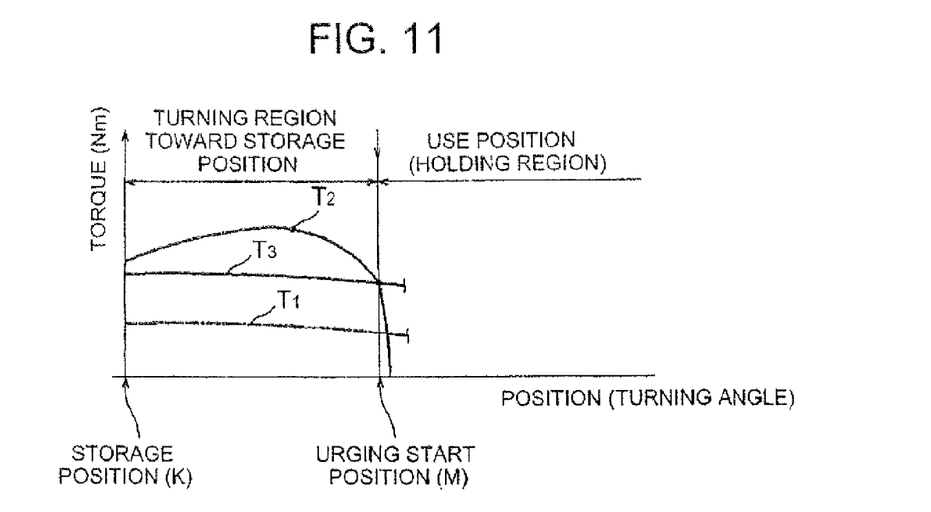
FIG. 11 is a graph that shows a turning angle of the sun visor body and a turning torque (turning force) of the sun visor body.

Next, the characteristic of the sun visor 10 according to the present embodiment will be described with reference to FIG. 11. In FIG. 11, the abscissa axis represents a turning angle (°) of the sun visor body 20 with respect to the storage position K as a reference (origin), and the ordinate axis represents a turning torque (turning force Nm) that acts on the sari visor body 20. That is, a characteristic T1 represents the braking force of the damper 26, which works at the time when the sun visor body 20 turns toward the storage position K, and a characteristic T2 represents the turning torque of the leaf spring 24 of the bearing portion 25, which attempts to turn the sun visor body 20 toward the storage position K. In addition, a characteristic T3 represents turning torque at the time when the sun visor body 20 attempts to turn under its own weight with respect to the support shaft 30. As described above, the damper 26 has the fluid passage 274j of the partition wall 274t such that braking force is small during forward rotation of the rotor 270 and braking force is large during reverse rotation of the rotor 270. The damper 26 is mounted on the sun visor body 20 such that, as shown in FIG. 2, the rotor 270 rotates in the forward direction at the time when the sun visor body 20 turns from the storage position K toward the use position and the rotor 270 rotates in the reverse direction at the time when the sun visor body 20 returns from the use position to the storage position K.

When the sun visor 10 is used, the sun visor body 20 located at the storage position K is held with hand and is turned to the use position. At this time, until the sun visor body 20 exceeds the urging start position M, the turning torque of the leaf spring 24, which attempts to turn the sun visor body 20 toward the storage position K, acts on the sun visor body 20, so the sun visor body 20 is turned by force that exceeds the turning torque. Here, when the sun visor body 20 is turned toward the use position, turning force under the own weight of the sun visor body 20 acts in the turning direction. In addition, the rotor 270 of the damper 26 rotates in the forward direction, so braking force reduces.

Therefore, it becomes easy to operate the sun visor body 20 toward the use position. When the sun visor body 20 exceeds the urging start position M, the spring force of the leaf spring 24 keeps balance in the circumferential direction, and acts in the direction in which the lateral shaft 32 of the support shaft 30 is fastened. Thus, when a turn of the sun visor body 20 is stopped at the use position, the sun visor body 20 is held at a current position by the spring force of the leaf spring 24. In addition, it is also possible to slide the sun visor body 20 at the use position with respect to the lateral shaft 32 of the support shaft 30. Furthermore, when the sun visor body 20 turns to a position that exceeds the urging start position M (use position), the electrode portion 324 provided at the distal end of the lateral shaft 32 of the support shaft 30 operates on the function of the electrode receiving portion 27a of the switch 27. Therefore, when the lid 20x of the mirror unit 20m is opened and a switch body portion 27b of the switch 27 operates, the room lamp 5 on the ceiling surface 4 of the vehicle cabin lights up.

When the sun visor 10 is stored, the sun visor body 20 placed at the use position is turned to the urging start position M against the fastening force (holding force) of the leaf spring 24 and the braking force of the damper 26. The turning torque of the leaf spring 24, which attempts to turn the sun visor body 20 toward the storage position K, acts on the sun visor body 20 from the urging start position M, so the sun visor body 20 is returned to the storage position K by the turning torque of the leaf spring 24. At the time when the sun visor body 20 is returned from the urging start position M to the storage position K, the weight of the sun visor body 20 acts in the opposite direction to the turn. In the sun visor 10 according to the present embodiment, the braking force T1 of the damper 26 is set on the basis of [Turning Torque T2 of Leaf Spring 24]-[Turning Force T3 under Own Weight of Sun, Visor Body 20].

That is, when a turning speed at the time when the sun visor body 20 is returned from the urging start position M to the storage position K is lower than or equal to a predetermined speed, [Braking Force T1 of Damper 26] is set so as to be smaller than [Turning Torque T2 of Leaf Spring 24]-[Turning Force T3 under Own Weight of Sun Visor Body 20]. Therefore, the sun visor body 20 gently turns while the turn of the sun visor body 20 toward the storage position K is not stopped by the damper 26, and bumps against the ceiling surface 4. Thus, it is possible to reduce unpleasant sound caused by storing the sun visor body 20. When the turning speed at the time when the sun visor body 20 is returned from the urging start position M to the storage position K exceeds the predetermined speed, [Braking Force T1 of Damper 26] is set so as to be larger than or equal to [Turning Torque T2 of Leaf Spring 24]-[Turning Force T3 under Own Weight of Sun Visor Body 20]. Therefore, for example, when an occupant strongly turns the sun visor body 20 toward the storage position K and the turning speed of the sun visor body 20 exceeds the predetermined speed, force in a direction in which a turn of the sun visor body 20 toward the storage position K is stopped is applied by the damper 26, so it is possible to reduce unpleasant sound due to a bump of the sun visor body 20 against the ceiling surface 4. Here, when the turning speed of the sun visor body 20 falls within the range of 0 to 3 rpm, bumping sound due to a bump of the sun visor body 20 against the ceiling surface 4 becomes substantially nothing, and, when the turning speed exceeds 3 rpm and is lower than or equal to about 5 rpm, slight bumping sound is generated. When the turning speed exceeds 5 rpm and is lower than or equal to 10 rpm, bumping sound slightly increases, and, when the turning speed exceeds 10 rpm, unpleasant bumping sound is generated. The range of the turning speed of the sun visor body 20 between about 7 rpm to about 15 rpm is a normal operation range. Therefore, the predetermined speed is desirably set between 3 rpm to 10 rpm.

Figure 12A:
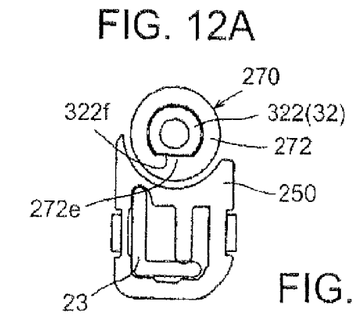
FIG. 12A is a schematic view that shows an alternative embodiment of the detent structure for the support shaft with respect to a rotor of the damper.
Figure 12B:
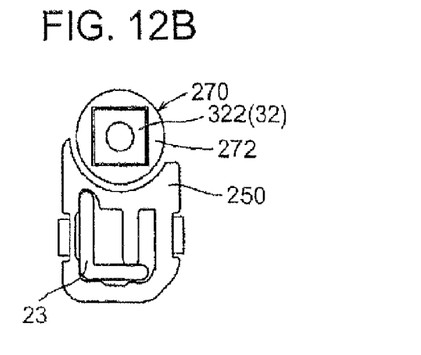
FIG. 12B is a schematic view that shows an alternative embodiment of the detent structure for the support shaft with respect to the rotor of the damper.
Figure 12C:
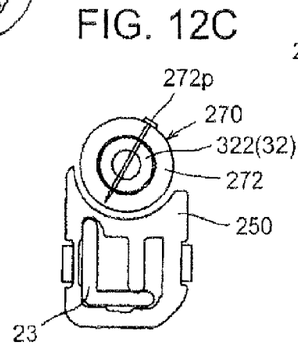
FIG. 12C is a schematic view that shows an alternative embodiment of the detent structure for the support shaft with respect to the rotor of the damper.
Figure 13A:
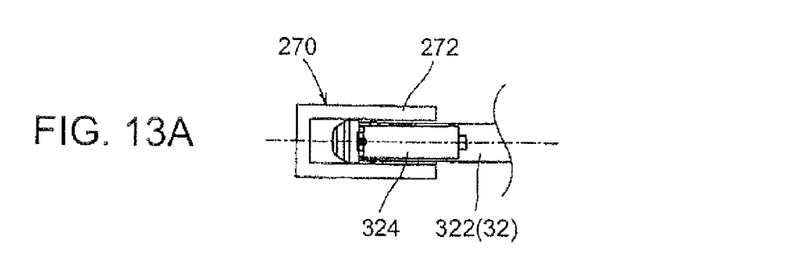
FIG. 13A is a schematic view that shows an alternative embodiment of an insertion structure for the support shaft with respect to the rotor of the damper.
Figure 13B:
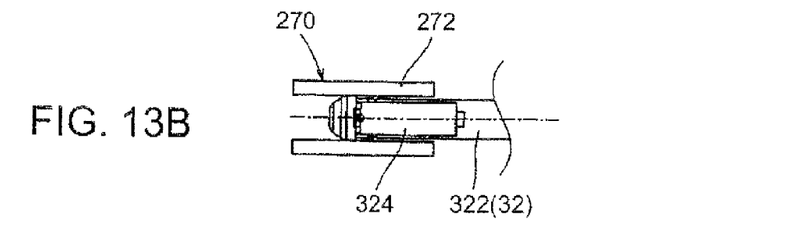
FIG. 13B is a schematic view that shows an alternative embodiment of an insertion structure for the support shaft with respect to the rotor of the damper.
Figure 14:
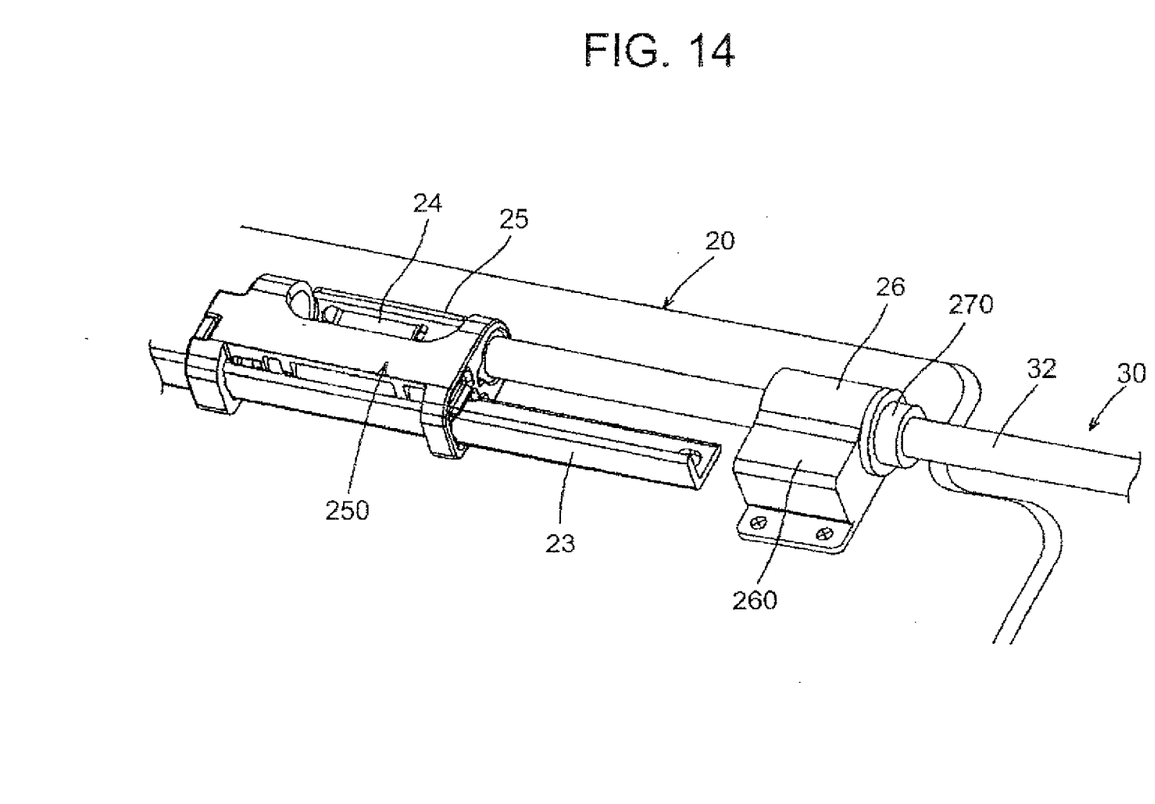
FIG. 14 is a schematic perspective view that shows an alternative embodiment of a mounting structure of the bearing portion and damper of the sun visor body.

Here, the invention is not limited to the above-described embodiment; it may be modified without departing from the scope of the invention. For example, in the present embodiment, the description is made on the example in which, as a rotation stopper for the lateral shaft 32 of the support shaft 30 with respect to the rotor 270 of the damper 26, the rotor 270 has the detent cutout 272k, the lateral shaft 32 has the detent 323 and both 272k, 323 are fitted to each other. Instead, as shown in FIG. 12A, it is possible to constitute a rotation stopper by forming a projecting portion 272e on the inner periphery of the rotor body 272 of the rotor 270 and forming a recess 322f, to which the projecting portion 272e is fitted, on the outer periphery of the small-diameter portion 322 of the lateral shaft 32. In addition, as shown in FIG. 12B, it is possible to constitute a rotation stopper by forming the inside of the rotor body 272 into a rectangular shape and forming the small-diameter portion 322 of the lateral shaft 32 into a rectangular columnar shape. Furthermore, as shown in FIG. 12C, it is also applicable that a through-hole that is continuous in the radial direction from the rotor body 272 of the rotor 270 to the small-diameter portion 322 of the lateral shaft 32 is formed and a detent pin 272p is inserted in the through-hole. In addition, in the present embodiment, the description is made on the example in which the lateral shaft 32 of the support shaft 30 is inserted through the rotor 270 of the damper 26. However, depending on the type of sun visor, it is also applicable that, as shown in FIG. 13A and FIG. 13B, the distal end portion of the lateral shaft 32 of the support shaft 30 is retained inside the rotor 270 of the damper 26. In the present embodiment, as shown in FIG. 5, the description is made on the example in which the damper 26 and the bearing portion 25 are held so as to be relatively non-movable in the axial direction with respect to the lateral shaft 32 of the support shaft 30 and the damper 26 and the bearing portion 25 both are arranged so as to be movable along the slide rail 23. However, it is also applicable that, as shown in FIG. 14, the damper 26 and the bearing portion 25 are spaced apart from each other, the damper 26 is directly mounted on the sun visor body 20, the lateral shaft 32 of the support shaft 30 is held so as to be relatively non-rotatable and axially slidable with respect to the rotor 270 of the damper 26, and the bearing portion 25 coupled to the lateral shaft 32 is allowed to move along the slide rail 23. In addition, in the present embodiment, the description is made on the example in which the damper 26 and the bearing portion 25 are coupled to each other by utilizing the coupling pawl 265 and the pawl receiving portion 258. However, the damper 26 and the bearing portion 25 may be coupled to each other by a screw or welding. Alternatively, for example, the damper 26 and the bearing portion 25 may be coupled to each other using another component, such as an E type retaining ring. Furthermore, the case 260 of the damper 26 and the case 250 of the bearing portion 25 may be integrally molded. In addition, in the present embodiment, the description is made on the example in which the support shaft 30 is formed of a cylindrical shaft member. However, the support shaft 30 may be formed of a solid shaft member. Furthermore, in the present embodiment, the description is made on the example in which the L-shaped through-holes 251, 261, through which the slide rail 23 is inserted, are respectively formed in the cases 250, 260 of the bearing portion 25 and damper 26. However, as long as a hole allows the slide rail 23 to be inserted therethrough such that the slide rail 23 is relatively non-rotatable, the hole is not particularly limited to an L-shaped through-hole. In addition, in the present embodiment, the description is made on the example in which, by forming the tapered fluid passage 274j in the partition wall 274t of the hydraulic pressure receiving portion 274 in the rotor 270 of the damper 26, fluid is easily passed at the time when the rotor 270 rotates in the forward direction (the sun visor body 20 turns toward the use position) and fluid is hard to be passed at the time when the rotor 270 rotates in the reverse direction (the sun visor body 20 turns toward the storage position). However, instead of forming the tapered fluid passage 274j in the partition wall 274t, it is applicable that the outer periphery of the partition wall 274t has an inclination, fluid is easily passed at the time when the rotor 270 rotates in the forward direction (the sun visor body 20 turns toward the use position) and fluid is hard to be passed at the time when the rotor 270 rotates in the reverse direction (the sun visor body 20 turns toward the storage position). In addition to the inclination of the outer periphery of the partition wall 274t, the fluid passage 274j may be formed.

What is claimed is:

1. A vehicle sun visor comprising:
    a sun visor body;
    a support shaft mounted on a ceiling surface of a vehicle cabin and configured to support the sun visor body at a turning center position of the sun visor body such that the sun visor body is turnable between a storage position at which the sun visor body is oriented along the ceiling surface of the vehicle cabin and a use position at which the sun visor body is able to block light;
    an urging member configured to, when a turning angle of the sun visor body from the storage position is smaller than or equal to a predetermined angle, apply turning force toward the storage position to the sun visor body; and
    a damper configured to apply braking force at the time when the sun visor body turns, wherein
    when a turning speed of the sun visor body toward the storage position is lower than or equal to a predetermined speed, the braking force of the damper is smaller than a value obtained by subtracting turning force based on the weight of the sun visor body from the turning force of the urging member, and, when the turning speed toward the storage position exceeds the predetermined speed, the braking force of the damper is larger than or equal to the value obtained by subtracting the turning force based on the weight of the sun visor body from the turning force of the urging member.

2. The vehicle sun visor according to claim 1, wherein the braking force of the damper is set so as to be larger when the sun visor body is turned toward the storage position than when the sun visor body is turned toward the use position.

3. The vehicle sun visor according to claim 2, wherein the predetermined speed is set within a range of 3 rpm to 10 rpm.

4. The vehicle sun visor according to claim 1, wherein the predetermined speed is set within the range of 3 rpm to 10 rpm.

5. The vehicle sun visor according to claim 1, wherein the urging member comprises a leaf spring.

6. The vehicle sun visor according to claim 1, wherein the damper is configured to apply braking force at the time when the sun visor body turns towards the storage position and when the sun visor body turns towards the use position.

7. A vehicle sun visor comprising:
a sun visor body;
a support shaft mounted on a ceiling surface of a vehicle cabin and configured to support the sun visor body at a turning center position of the sun visor body such that the sun visor body is turnable between a storage position at which the sun visor body is oriented along the ceiling surface of the vehicle cabin and a use position at which the sun visor body is able to block light;
an urging member configured to, when a turning angle of the sun visor body from the storage position is smaller than or equal to a predetermined angle, apply turning force toward the storage position to the sun visor body; and
a damper configured to apply braking force at the time when the sun visor body turns,
wherein when a turning speed of the sun visor body toward the storage position is lower than or equal to a predetermined speed set within a range of 3 rpm to 10 rpm, the braking force of the damper is smaller than a value obtained by subtracting turning force based on the weight of the sun visor body from the turning force of the urging member, and, when the turning speed toward the storage position exceeds the predetermined speed, the braking force of the damper is larger than or equal to the value obtained by subtracting the turning force based on the weight of the sun visor body from the turning force of the urging member, and wherein the braking force of the damper is set so as to be larger when the sun visor body is turned toward the storage position than when the sun visor body is turned toward the use position.

8. A vehicle sun visor comprising:
a sun visor body;
a support shaft mounted on a ceiling surface of a vehicle cabin and configured to support the sun visor body at a turning center position of the sun visor body such that the sun visor body is turnable between a storage position at which the sun visor body is oriented along the ceiling surface of the vehicle cabin and a use position at which the sun visor body is able to block light;
an urging member configured to, when a turning angle of the sun visor body from the storage position is smaller than or equal to a predetermined angle, apply turning force toward the storage position to the sun visor body; and
a damper configured to apply braking force at the time when the sun visor body turns, wherein when a turning speed of the sun visor body toward the storage position is lower than or equal to a predetermined speed set within a range of 3 rpm to 10 rpm, the braking force of the damper is smaller than a value obtained by subtracting turning force based on the weight of the sun visor body from the turning force of the urging member, and, when the turning speed toward the storage position exceeds the predetermined speed, the braking force of the damper is larger than or equal to the value obtained by subtracting the turning force based on the weight of the sun visor body from the turning force of the urging member.

* * * * *